(12) United States Patent
Xia et al.

(10) Patent No.: US 9,167,396 B2
(45) Date of Patent: Oct. 20, 2015

(54) METHOD AND APPARATUS TO TRANSMIT DATA THROUGH TONES

(71) Applicant: MARVELL WORLD TRADE LTD., St. Michael (BB)

(72) Inventors: Binqiang Xia, Shanghai (CN); Xing Li, Shanghai (CN)

(73) Assignee: Marvell World Trade Ltd., St. Michael (BB)

( * ) Notice: Subject to any disclaimer, the term of this patent is extended or adjusted under 35 U.S.C. 154(b) by 106 days.

(21) Appl. No.: 14/151,437

(22) Filed: Jan. 9, 2014

(65) Prior Publication Data

US 2014/0200882 A1 Jul. 17, 2014

Related U.S. Application Data

(60) Provisional application No. 61/752,747, filed on Jan. 15, 2013.

(51) Int. Cl.
*H04M 11/00* (2006.01)
*H04W 4/14* (2009.01)
*H04B 11/00* (2006.01)
*H04L 5/00* (2006.01)
*H04M 3/42* (2006.01)

(52) U.S. Cl.
CPC .................. *H04W 4/14* (2013.01); *H04B 11/00* (2013.01); *H04L 5/0005* (2013.01); *H04M 3/42382* (2013.01)

(58) Field of Classification Search
CPC .. H04M 11/00; H04M 3/42382; H04B 11/00; H04L 5/0005; H04W 4/14
USPC .......... 379/93.05, 93.26, 93.18, 93.27, 93.28, 379/386, 102.01, 102.02, 102.03; 704/205
See application file for complete search history.

(56) References Cited

U.S. PATENT DOCUMENTS

| | | | | |
|---|---|---|---|---|
| 6,014,441 | A * | 1/2000 | Mark | 379/361 |
| 6,233,323 | B1 * | 5/2001 | Ali et al. | 379/93.27 |
| 2002/0001368 | A1 * | 1/2002 | Smith et al. | 379/52 |
| 2004/0081078 | A1 * | 4/2004 | McKnight et al. | 370/210 |
| 2013/0145439 | A1 * | 6/2013 | Lee | 726/5 |

* cited by examiner

*Primary Examiner* — Melur Ramakrishnaiah

(57) ABSTRACT

Aspects of the disclosure provide a method for transmitting data. The method includes encoding data, by a first device, symbol-by-symbol into a first electrical signal of frequencies in a specific range, mixing, by the first device, the first electrical signal with a second electrical signal corresponding to captured voices, and transmitting, by the first device, the mixed electrical signal to a second device via a channel being configured for transmitting the captured voices.

20 Claims, 3 Drawing Sheets

|        | 1209 Hz | 1336 Hz | 1477 Hz | 1633 Hz |
|--------|---------|---------|---------|---------|
| 697 Hz | 1       | 2       | 3       | A       |
| 770 Hz | 4       | 5       | 6       | B       |
| 852 Hz | 7       | 8       | 9       | C       |
| 941 Hz | E       | 0       | F       | D       |

METHOD AND APPARATUS TO TRANSMIT DATA THROUGH TONES

INCORPORATION BY REFERENCE

This present disclosure claims the benefit of U.S. Provisional Application No. 61/752,747, "APPARATUS AND ALGORITHM TO TRANSFER STRUCTURE DATA THROUGH TONES WITH VOICE CALL" filed on Jan. 15, 2013, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, text messages are transmitted from a mobile device to another mobile device via a signaling channel that provides control signals for mobile communication. In an example, a first mobile device converts each symbol in a text message into, for example, a 7-bit binary code. Then, the first mobile device sends the text message as a stream of binary codes via the signaling channel during time periods when no signaling traffic exists. The text message from the first mobile device is stored in a message service center which then forwards the text message to a second mobile device.

SUMMARY

Aspects of the disclosure provide a method for transmitting data. The method includes encoding data, by a first device, symbol-by-symbol into a first electrical signal of frequencies in a specific range, mixing, by the first device, the first electrical signal with a second electrical signal corresponding to captured voices, and transmitting, by the first device, the mixed electrical signal to a second device via a channel being configured for transmitting the captured voices.

To encode the data symbol-by-symbol into the first electrical signal of the frequencies in the specific range, in an example, the method includes encoding the data symbol-by-symbol into the first electrical signal of the frequencies in a range of the captured voices.

According to an aspect of the disclosure, the method includes encoding the data symbol-by-symbol into tones based on a mapping of symbols to tones. In an embodiment, the method includes encoding a symbol into a digital stream corresponding to a wave of one or more tones according to the mapping of symbols to tones. In an example, the method includes storing digital streams respective to symbols. Further, the method includes mixing a first digital stream corresponding to the waves of the tones with a second digital stream corresponding to the captured voices. For example, the method includes mixing the first digital stream with the second digital stream using a time-division multiplexing (TDM) technique.

In an embodiment, the method includes signaling, from the first device to the second device, to handshake with the second device before encoding the data in the mixed electrical signal.

Aspects of the disclosure provides an apparatus including a coder-decoder and a transmitter. The coder-decoder is configured to encode data symbol-by-symbol into a first electrical signal of frequencies in a specific range and mix the first electrical signal with a second electrical signal corresponding to captured voices. The transmitter is configured to transmit the mixed electrical signal to another apparatus via a channel being configured for transmitting the captured voices.

Aspects of the disclosure provide a non-transitory computer readable medium storing program instructions for causing a processor in a device to execute operations for transmitting data to another device. The operations includes encoding data symbol-by-symbol into a first electrical signal of frequencies in a specific range, and mixing the first electrical signal with a second electrical signal corresponding to captured voices. The mixed electrical signal is transmitted to the other device via a channel being configured for transmitting the captured voices.

BRIEF DESCRIPTION OF THE DRAWINGS

Various embodiments of this disclosure that are proposed as examples will be described in detail with reference to the following figures, wherein like numerals reference like elements, and wherein:

FIG. 2 shows a table 200 of tone-based encoding/decoding example according to an embodiment of disclosure.

DETAILED DESCRIPTION OF EMBODIMENTS

Figure 1:
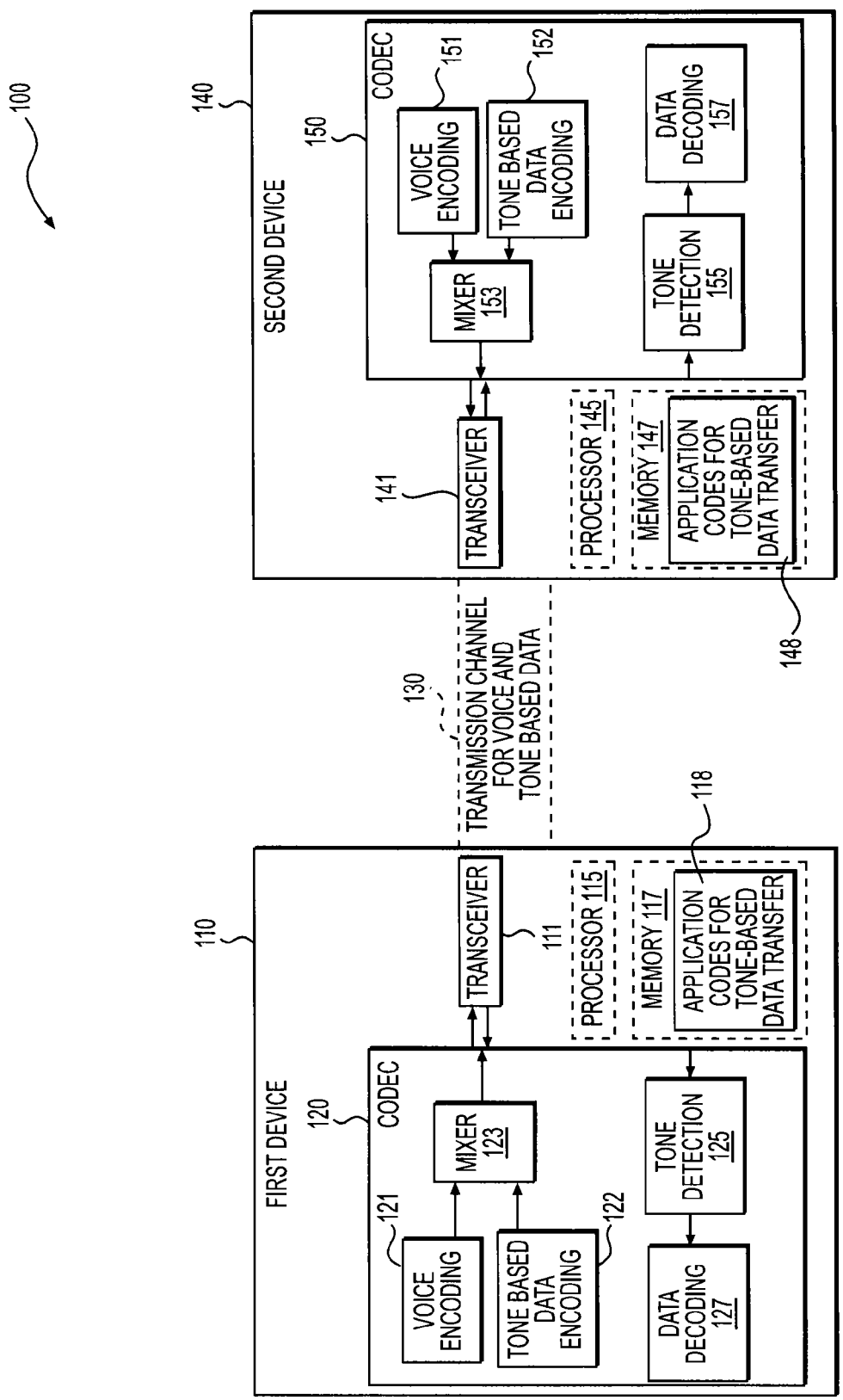
FIG. 1 shows a block diagram of a communication system example 100 according to an embodiment of the disclosure.

FIG. 1 shows a block diagram of a communication system example 100 according to an embodiment of the disclosure. The communication system 100 includes a plurality of devices, such as a first device 110, a second device 140, and a like. The plurality of devices communicates via a transmission channel 130 for transmitting signals that carry both human voices to enable voice communication and data encoded using frequencies in the range of human voices.

The plurality of devices can be any suitable devices configured to enable sound based communication, such as corded phones, cordless phones, mobile phones, computers, laptops, tablets, and the like. In an example, each of the plurality of devices includes a microphone (not shown) that captures and converts sound in a frequency range, such as sound in a human voice frequency range (e.g., approximately 300 Hz to 3400 Hz), to an electrical signal. The electrical signal is further processed in the device. In an example, the electrical signal is sampled and converted to a digital stream, for example by an analog-to-digital converter (not shown). Further, the digital stream is suitably encoded. Then, in an example, a carrier signal is modulated according to the encoded digital stream to carry the captured sound. The carrier signal that carries the captured sound is then transmitted by the device via the transmission channel 130.

Further, in an example, each of the plurality of devices includes a loudspeaker (not shown) that produces sound in response to an electrical signal, such as an electrical audio signal, and the like. For example, the device receives a carrier signal that carries the electrical audio signal from the transmission channel 130. The carrier signal is processed to obtain the electrical audio signal. The loudspeaker converts the electrical audio signal into sound (e.g., voices).

The transmission channel 130 can include any suitable transmission medium and can be setup according to any suitable standard, protocol and the like. In an example, the communication system 100 is a mobile communication system, and the transmission channel 130 includes one or more radio base stations that setup a path according to a mobile protocol to transmit signals between the first device 110 and the second device 140. The signals carry voices captured by the first device 110 and the second device 140. It is noted that, in an example, other suitable channels (not shown) in addition to the transmission channel 130 of voice transmission exist between the first device 110 and the second device 140, such as a signaling path for transmitting control signals to control the communication between the first device 110 and the second device 140, and the like.

According to an aspect of the disclosure, data, such as a text message, and the like is communicated between the first device 110 and the second device 140 via the transmission channel 130. In an example, a text message is encoded symbol-by-symbol into a first electrical signal using frequencies in a specific range, such as in a human voice range, according to a pre-defined encoding technique of symbols to frequencies. The first electrical signal is mixed with a second electrical signal corresponding to captured voices. The mixed electrical signal is suitably processed and is transmitted via the transmission channel 130.

Specifically, in the FIG. 1 example, the first device 110 includes a coder-decoder (CODEC) 120 and a transceiver 111. In an example, the transceiver 111 includes a transmitting circuit (not shown) and a receiving circuit (not shown). The transmitting circuit (e.g., transmitter) is configured to transmit a carrier signal that carries a digital stream and the receiving circuit (receiver) is configured to receive a carrier signal that carriers a digital stream.

The CODEC 120 is configured to provide a digital stream to the transceiver 111 to transmit and to receive and process a digital stream from the transceiver 111. In the FIG. 1 example, the CODEC 120 includes a voice encoding module 121, a tone based data encoding module 122, a mixer 123, a tone detection module 125 and a data decoding module 127. These elements are coupled together as shown in FIG. 1.

In an embodiment, the voice encoding module 121 is configured to suitably generate a digital stream corresponding to captured sound. In an example, a microphone generates an electrical signal in response to captured sound. The voice encoding module 121 includes an ADC that samples and quantizes the electrical signal for pulse-code-modulation (PCM. In an example, each sample is quantized into, for example, a 4-digit binary number. The binary numbers of the samples then form a digital stream.

Further, the tone based data encoding module 122 is configured to encode data to transfer into tone based digital stream. The data can be any suitable type of data. In an example, the data is contact information in English that includes alphabet letters and decimal digits. In another example, the data is contact information in Chinese that includes Chinese symbols and decimal digits.

The tone based data encoding module 122 can use any suitable encoding technique. In an example, each symbol of the contact information in Chinese is encoded as a four-digit hexadecimal number. Each hexadecimal digit is encoded as one of sixteen streams. The streams correspond to sound waves of different frequency components. In an example, each of the sixteen hexadecimal symbols (0-F) is encoded into a digital stream corresponding to a sound wave of two frequency components according to dual-tone multi-frequency (DTMF) signaling, such as according a table 200 shown in FIG. 2.

In the FIG. 2 example, the table 200 is a four-by-four matrix that includes four rows and four columns. Each row or each column has an assigned frequency. Eight different frequencies are used for the table 200. Thus, each element (e.g., a hexadecimal symbol) in the matrix is associated with a first frequency assigned to the row of the element and a second frequency assigned to the column of the element. The element is then encoded into a PCM stream corresponding to a sound wave having the first frequency and the second frequency components.

According to an aspect of the disclosure, to encode a hexadecimal symbol, a first sinusoidal wave of the first frequency and a second sinusoidal wave of the second frequency are superimposed. The superimposed wave is sampled, for example using the same sampling frequency as the ADC of the voice encoding module 121. The samples are then quantized for pulse-code-modulation (PCM). For example, each sample is quantized into a 4-digit binary number. The binary numbers for the samples form a digital stream.

In an implementation example, a processor, such as a processor 115 in the FIG. 1 example, executes an algorithm to calculate a PCM stream for each hexadecimal symbol.

In another implementation example, the tone-based data encoding module 122 stores, in a memory, such as a memory 117 in the FIG. 1 example, pre-calculated digital streams respective corresponding to the sixteen hexadecimal symbols (0-F). To encode a hexadecimal symbol, a pre-calculated digital stream corresponding to the hexadecimal symbol is read from the memory 117.

In the FIG. 1 example, the mixer 123 suitably mixed a first digital stream output from the voice encoding module 121 and a second digital stream output from the tone based data encoding module 122. In an example, the mixer 123 uses a time-division multiplexing (TDM) technique to mix the first digital stream and the second digital stream. It is noted that the mixer 123 can be configured to use other suitable technique to mix first digital stream and the second digital stream. The mixed digital stream is provided to the transceiver 111 for transmission. In an example, according to setup of the transmission channel 130, the transceiver 111 modulates a carrier signal having a radio frequency to carry the mixed digital stream, and then the carrier signal is radiated as electromagnetic waves, by an antenna (not shown) for example.

It is noted that the CODEC 120 can include other suitable encoding module to encode the mixed digital stream.

When the transceiver 111 receives a carrier signal that carriers a digital stream, the transceiver 111 extracts the digital stream from the carrier signal, and provides the extracted digital stream to the CODEC 120. In an example, the tone detection module 125 detects tones in the digital stream that are used to encode data. In an example, the tone detection module 125 processes the digital stream to detect the tones used for encoding data. For example, the tone detection module 125 uses fast Fourier transform to calculate the frequency components in the digital stream, and detects the eight tone frequencies of the table 200. Based on the tone frequencies, the data decoding module 127 decodes the data, for example according to the table 200 to convert the tone frequencies into hexadecimal symbols. In an embodiment, the first device 100 can be configured to let the loudspeaker play the tones or not to play the tones.

It is noted that the CODEC 120 can be implemented using any suitable technique. In an example, the CODEC 120 is implemented using integrated circuits. In another example, portions of the CODEC 120 are implemented as software instructions executed by a processor, such as the processor 115. In an embodiment, the memory 117 stores application codes 118 for toned based data transfer. The processor 115 executes the application codes 118 to perform the functions of portions of the CODEC 120, such as the tone based data encoding module 122, the tone detection 125, the data decoding 127, and the like. The application codes 118 can have other suitable functions. In an example, the application codes 118 can provide a user interface to enable a user to input data, or to input control information to select data stored in the first device 110, and the like. In another example, the application codes 118 have speech recognition function, such that the processor 118 operates based on captured speech context of the user.

It is also noted that the CODEC 120 can include other suitable modules to encode or decode a digital stream using other techniques.

The second device 140 operates similarly to the first device 110 described above. The second device 140 also utilizes certain components that are identical or equivalent to those used in the first device 110; the description of these components has been provided above and will be omitted here for clarity purposes.

During operation, in an example, the first device 110 and the second device 140 are mobile phones. The first device 110 is used by a first person, and the second device 140 is used by a second person. Then, the communication system 100 is suitably configured according to suitable mobile communication standards and protocols to start a phone call and enable voice communication between the first person and the second person. Specifically, the first device 110 and the second device 140 are configured to enable transmission and reception of signals that carry sound in a human voice frequency range. The transmission channel 130 is configured to provide a path for the signals that carry sound in the human voice frequency range to be transferred between the first device 110 and the second device 140.

During the phone call, for example, the first person wants to send data, for example a contact stored in the memory 117 of the first device 110, to the second person. In an embodiment, the first device 110 has speech recognition function, and retrieves the contact from the memory 117. In another embodiment, the first device 110 enables the first person to select the contact.

Then, the tone based data encoding module 122 encodes the contact into the second digital stream corresponding to sound waves of tones in the human voice frequency range. The mixer 123 mixes the second digital stream of tones with the first digital stream output from the voice encoding module 121. The first digital stream is generated in response to captured voices of the first person. The transceiver 111 modulates a carrier signal based on the mixed digital stream to carry the mixed digital stream, and transmits the carrier signal to the second device 140 via the transmission channel 130.

At the second device 140, the transceiver 141 receives the carrier signal that carries the mixed digital stream, demodulates the carrier signal and retrieves the mixed digital stream. The tone detection module 155 detects frequency components (tones) that are used for data encoding. The data decoding 157 then decodes the frequency components into the contact. Then contact is stored in the memory 147 for example.

Figure 3:
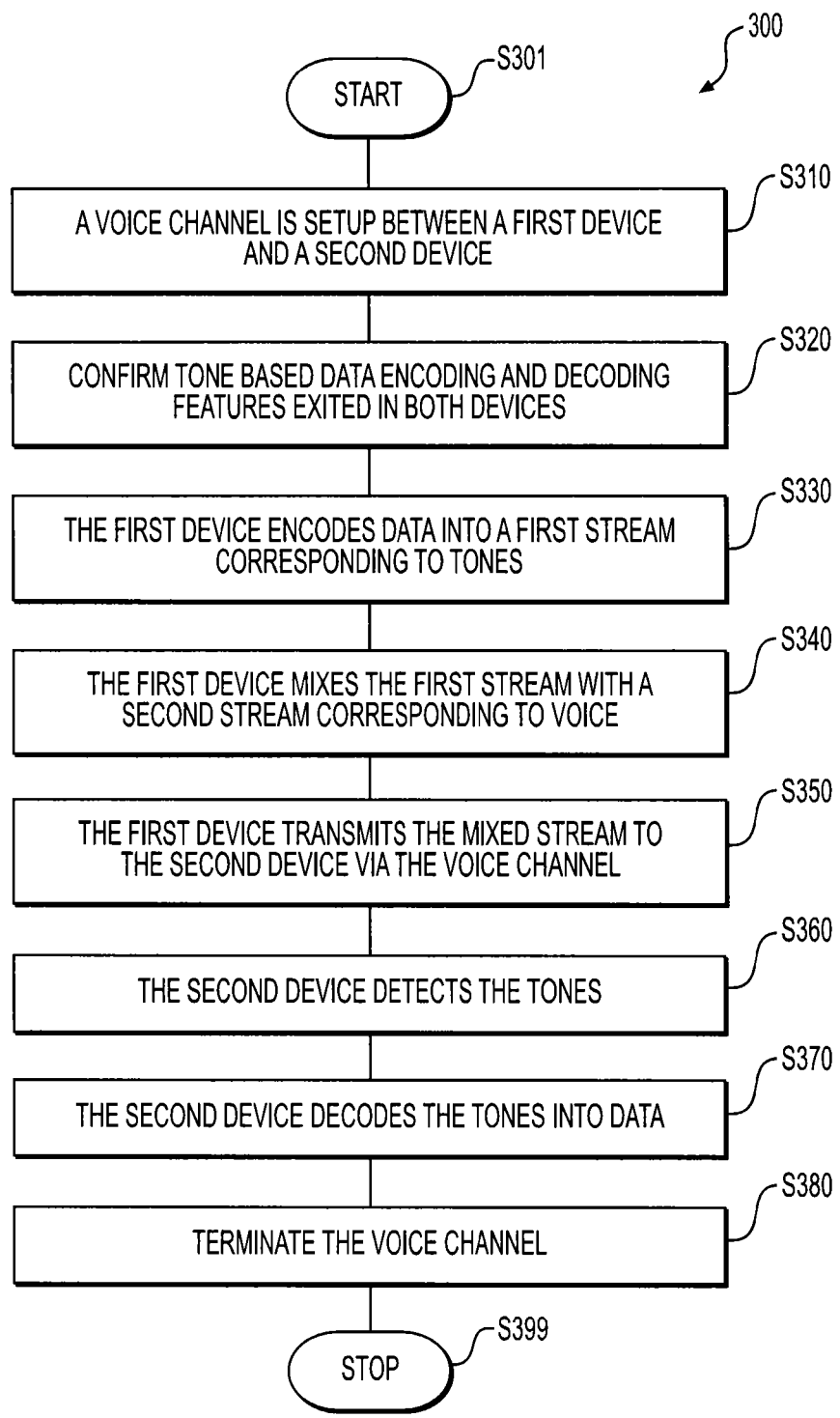
FIG. 3 shows a flow chart outlining a process example 300 according to an embodiment of the disclosure.

FIG. 3 shows a flow chart outlining a process example 300 to transfer data through tones according to an embodiment of the disclosure. In an example, the process 300 is executed in the communication system 100. The process starts at S301, and proceeds to S310.

At S310, a voice channel is set up between a first device and a second device. In the FIG. 1 example, the transmission channel 130 is setup between the first device 110 and the second device 140 to transmit voices between the first device 110 and the second device 140. In an embodiment, the first device 110 and the second device 140 are mobile phones. The communication system 100 is suitably set up according to suitable mobile communication standards and protocols to start a phone call and enable voice communication. Specifically, the first device 110 and the second device 140 are configured to enable transmission and reception of signals that carry sound in a human voice frequency range. The transmission channel 130 is configured to provide a path for the signals that carry sound in the human voice frequency range to be transferred between the first device 110 and the second device 140.

At S320, tone based data encoding and decoding features are confirmed to exist in both the first device and the second device. In the FIG. 1 example, both the first device 110 and the second device 140 are installed with application codes for tone based data transfer. In an embodiment, when the first device 110 needs to send data to the second device 140, the first device 110 starts a hand-shake procedure to confirm that the second device 140 has the tone based data encoding/decoding feature. In an example, the first device 110 sends specific tones to the second device 140. When the second device 140 recognizes the specific tones, the second device 140 sends a reply, for example, of specific tones, to the first device 110. When the first device 110 receives the reply, the first device 110 confirms that the second device 140 has the tone based data encoding/decoding feature. It is noted that, in an example, when the first device 110 does not receive the reply within a time duration, the first device 110 notifies the user, and the user may use other technique to send data to the second device 140.

At S330, the first device encodes data into a first digital stream corresponding to tones having frequencies in the human voice frequency range. In an example, each hexadecimal symbol is encoded into a digital stream corresponding to a sound wave having two tones of frequency components in the human voice frequency range.

At S340, the first device mixes the first digital stream with a second digital stream corresponding to captured voices. In the FIG. 1 example, the voice encoding module 121 receives an electrical signal in response to captured voices. The voice encoding module 121 samples and quantizes the electrical signal to generate the second digital stream. The mixer 123 mixes the first digital stream and the second digital stream, in an example using a TDM technique.

At S350, the first device transmits the mixed digital stream to the second device via the voice channel. In the FIG. 1 example, the transceiver 111 in the first device 110 modulates a carrier signal based on the mixed digital stream to carry the mixed digital stream, and transmits the carrier signal that carries the mixed digital stream to the second device 140 via the transmission channel 130 that has been setup for transmitting human voices.

At S360, the second device receives the mixed digital stream and detects tones. In the FIG. 1 example, the transceiver 141 in the second device 140 receives the carrier signal that carries the mixed digital stream, and demodulates the carrier signal to retrieve the mixed digital stream. The tone detection module 155 detects frequency components, such as the frequency components (tones) in the human voice frequency range used for encoding, such as the eight frequencies in FIG. 2, from the mixed digital stream.

At S370, the second device decodes the tones into data. In the FIG. 1 example, the data decoding module 157 decodes the detected tones into data, for example according to the table 200.

At S380, the voice channel is terminated. In the FIG. 1 example, when the phone call is terminates, the transmission channel 130 is suitably terminated according to suitable mobile communication standards and protocols. Then the process proceeds to S399 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for transmitting data, comprising:
   encoding data, by a first device, symbol-by-symbol into a first electrical signal of frequencies in a specific range;
   mixing, by the first device, the first electrical signal with a second electrical signal corresponding to captured voices; and
   transmitting, by the first device, the mixed electrical signal to a second device via a channel being configured for transmitting the captured voices.

2. The method of claim 1, wherein encoding the data symbol-by-symbol into the first electrical signal of the frequencies in the specific range further comprises:
   encoding the data symbol-by-symbol into the first electrical signal of the frequencies in a range of the captured voices.

3. The method of claim 1, wherein encoding the data symbol-by-symbol into the first electrical signal of the frequencies in the specific range further comprises:
   encoding the data symbol-by-symbol into tones based on a mapping of symbols to tones.

4. The method of claim 3, wherein encoding the data symbol-by-symbol into the tones based on the mapping of symbols to tones further comprises:
   encoding a symbol into a digital stream corresponding to a wave of one or more tones according to the mapping of symbols to tones.

5. The method of claim 4, further comprising:
   storing digital streams respective to symbols.

6. The method of claim 4, wherein mixing the first electrical signal with the second electrical signal corresponding to captured voices further comprises:
   mixing a first digital stream corresponding to the waves of the tones with a second digital stream corresponding to the captured voices.

7. The method of claim 6, wherein mixing the first digital stream corresponding to the waves of the tones with the second digital stream corresponding to the captured voices further comprises:
   mixing the first digital stream with the second digital stream using a time-division multiplexing (TDM) technique.

8. The method of claim 1, further comprising:
   signaling, from the first device to the second device, to handshake with the second device before encoding the data in the mixed electrical signal.

9. Apparatus, comprising:
   a coder-decoder configured to encode data symbol-by-symbol into a first electrical signal of frequencies in a specific range and mix the first electrical signal with a second electrical signal corresponding to captured voices; and
   a transmitter configured to transmit the mixed electrical signal to another apparatus via a channel being configured for transmitting the captured voices.

10. The apparatus of claim 9, wherein the coder-decoder is configured to encode the data symbol-by-symbol into the first electrical signal of the frequencies in a range of the captured voices.

11. The apparatus of claim 9, wherein the coder-decoder is configured to encode the data symbol-by-symbol into tones based on a mapping of symbols to tones.

12. The apparatus of claim 11, wherein the coder-decoder is configured to encode a symbol into a digital stream corresponding to a wave of one or more tones according to the mapping of symbols to tones.

13. The apparatus of claim 12, further comprising:
   a memory configured to store digital streams respective to symbols.

14. The apparatus of claim 12, wherein the coder-decoder is configured to mix a first digital stream corresponding to the waves of the tones with a second digital stream corresponding to the captured voices.

15. The apparatus of claim 14, wherein the coder-decoder is configured to mix the first digital stream with the second digital stream using a time-division multiplexing (TDM) technique.

16. A non-transitory computer readable medium storing program instructions for causing a processor in a device to execute operations for transmitting data to another device, the operations comprising:
   encoding data symbol-by-symbol into a first electrical signal of frequencies in a specific range; and
   mixing the first electrical signal with a second electrical signal corresponding to captured voices, the mixed electrical signal is transmitted to the other device via a channel being configured for transmitting the captured voices.

17. The non-transitory computer readable medium of claim 16, wherein the operation of encoding the data symbol-by-symbol into the first electrical signal of the frequencies in the specific range further comprises:
   encoding the data symbol-by-symbol into the first electrical signal of the frequencies in a range of the captured voices.

18. The non-transitory computer readable medium of claim 16, wherein the operation of encoding the data symbol-by-symbol into the first electrical signal of the frequencies in the specific range further comprises:
   encoding the data symbol-by-symbol into tones based on a mapping of symbols to tones.

19. The non-transitory computer readable medium of claim 16, wherein the operation of encoding the data symbol-by-symbol into the tones based on the mapping of symbols to tones further comprises:
   encoding a symbol into a digital stream corresponding to a wave of one or more tones according to the mapping of symbols to tones.

20. The non-transitory computer readable medium of claim 16, wherein the operation of mixing the first electrical signal with the second electrical signal corresponding to captured voices further comprises:
   mixing a first digital stream corresponding to the waves of the tones with a second digital stream corresponding to the captured voices using a time-division multiplexing (TDM) technique.

* * * * *